US008164688B2

(12) United States Patent
Wu

(10) Patent No.: US 8,164,688 B2

(45) Date of Patent: Apr. 24, 2012

(54) FREQUENCY ADJUSTING APPARATUS AND ADJUSTING METHOD THEREOF

(75) Inventor: Shan Tsung Wu, Taipei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 579 days.

(21) Appl. No.: 12/404,862

(22) Filed: Mar. 16, 2009

(65) Prior Publication Data

US 2009/0256971 A1 Oct. 15, 2009

(30) Foreign Application Priority Data

Apr. 9, 2008 (TW) ................................ 97112833 A

(51) Int. Cl.
*H04N 5/50* (2006.01)

(52) U.S. Cl. ........ 348/536; 348/735; 348/541; 348/537; 348/731; 375/344

(58) Field of Classification Search .................. 348/731, 348/725, 735, 536, 537, 541, 544; 375/344
See application file for complete search history.

(56) References Cited

U.S. PATENT DOCUMENTS

| | | | | |
|---|---|---|---|---|
| 2005/0184905 | A1 * | 8/2005 | Kobayashi | 342/357.15 |
| 2008/0225176 | A1 * | 9/2008 | Selby et al. | 348/572 |

* cited by examiner

*Primary Examiner* — Jefferey Harold
*Assistant Examiner* — Jean W Desir
(74) *Attorney, Agent, or Firm* — WPAT., P.C.; Justin King

(57) ABSTRACT

A frequency adjusting method comprises steps of: generating a first adjusting signal according to a frequency of a first output signal; adjusting a frequency of an input signal by using the first adjusting signal to generate the first output signal, so as to adjust the frequency of the first output signal into a first range; generating a second adjusting signal according to a frequency of a second output signal; adjusting the frequency of the first output signal by using the second adjusting signal to generate the second output signal, so as to adjust the frequency of the second output signal into a second range; and adjusting the first adjusting signal and the second adjusting signal according to the second adjusting signal.

17 Claims, 4 Drawing Sheets

FREQUENCY ADJUSTING APPARATUS AND ADJUSTING METHOD THEREOF

CROSS REFERENCE TO RELATED PATENT APPLICATION

This patent application is based on a Taiwan, R.O.C. patent application No. 097112833 filed on Apr. 9, 2008.

FIELD OF THE INVENTION

The present invention relates to a frequency adjusting apparatus and an adjusting method thereof, and more particularly, to a frequency adjusting apparatus capable of effectively compensating frequency offset of an input signal, and an adjusting method thereof.

BACKGROUND OF THE INVENTION

A common communication system transmits signals by loading the signals on high-frequency carriers. The high-frequency signals are then down-converted to baseband signals for processing using a mixer at a receiving end. Take the Digital Video Broadcasting by satellite (DVB-S) for example, frequency signals are received and down-converted at a receiving end having a low noise block (LNB), and are amplified and down-converted by a tuner for subsequent demodulation using a demodulator. However, in actual practice, the LNB and the tuner achieve unsatisfactory down-conversion as expected in an ideal design. More specifically, the LNB is prone to undesirable effects from surrounding temperatures, such that frequency offset due to temperature and time variations is incurred at the receiving end.

SUMMARY OF THE INVENTION

Therefore, an objective of the invention is to provide a frequency adjusting apparatus and an adjusting method thereof, which are capable of compensating frequency offset of received signals as well as ensuring system stability.

A frequency adjusting apparatus according to one embodiment of the invention comprises a first frequency adjusting unit, a first adjusting frequency generating unit, a second frequency adjusting unit, a second adjusting frequency generating unit, and a controller. The first frequency adjusting unit adjusts a frequency of an input signal according to a first adjusting signal to generate a first output signal. The first adjusting frequency generating unit generates the first adjusting signal according to a frequency of the first output signal to adjust the frequency of the first output signal into a first range. The second frequency adjusting unit adjusts the frequency of the first output signal according to a second adjusting signal to generate a second output signal. The second adjusting frequency generating unit generates the second adjusting signal according to a frequency of the second output signal to adjust the frequency of the second output signal into a second rage. The controller controls the first adjusting frequency generating unit and the second adjusting frequency generating unit according to the second adjusting signal to adjust the first adjusting signal and the second adjusting signal.

A frequency adjusting method according to another embodiment of the invention comprises steps of: generating a first adjusting signal according to a frequency of a first output signal; adjusting a frequency of an input signal by using the first adjusting signal to generate the first output signal, so as to adjust the frequency of the first output signal into a first range; generating a second adjusting signal according to a frequency of a second output signal; adjusting the frequency of the first output signal by using the second adjusting signal to generate the second output signal, so as to adjust the frequency of the second output signal into a second range; and adjusting the first adjusting signal and the second adjusting signal according to the second adjusting signal.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
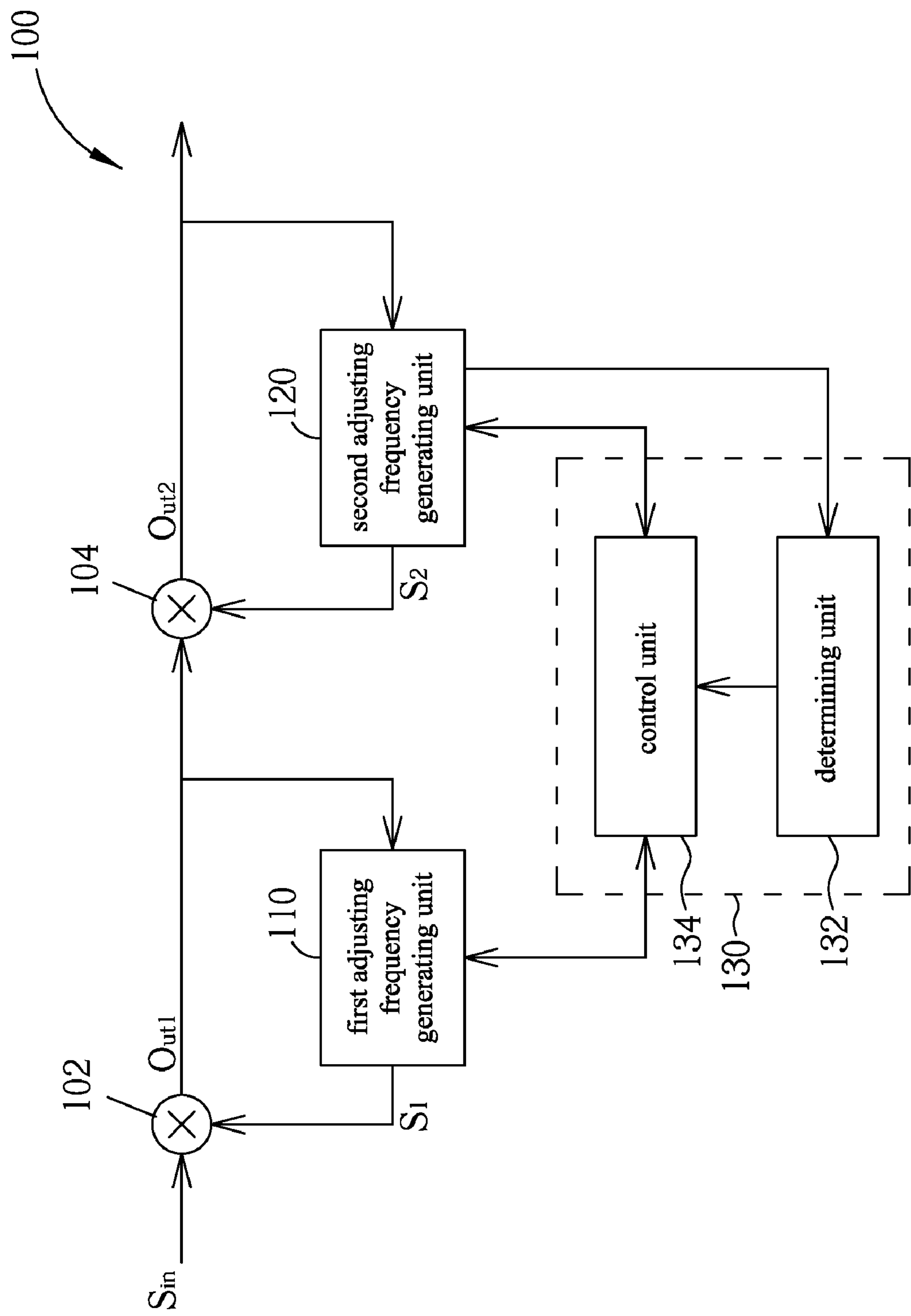
FIG. 1 is a functional diagram of a frequency adjusting apparatus according to one embodiment of the invention.

FIG. 1 shows a functional diagram of a frequency adjusting apparatus according to one embodiment of the invention. A frequency adjusting apparatus 100 is for adjusting a frequency of an input signal Sin. In an application, when frequency offset occurs in the input signal Sin, the frequency adjusting apparatus 100 is capable of compensating the frequency offset to calibrate the frequency of the input signal Sin. The frequency adjusting apparatus 100 comprises a first frequency adjusting unit 102, a first adjusting frequency generating unit 110, a second frequency adjusting unit 104, a second adjusting frequency generating unit 120 and a controller 130. The first frequency adjusting unit 102 adjusts a frequency of an input signal Sin by using a first adjusting signal S1 to output a first output signal Out1. The first adjusting frequency generating unit 110 generates the first adjusting signal S1 according to a frequency of the first output signal Out1 to adjust the frequency of the first output signal Out1 into a first range. Next, the second frequency adjusting unit 104 adjusts the frequency of the first output signal by using a second adjusting signal S2 to generate a second output signal Out2. The second adjusting frequency generating unit 120 generates the second adjusting signal S2 according to a frequency of the second output signal Out2 to adjust the frequency of the second output signal Out2 into a second range. In this embodiment, the first adjusting frequency generating unit 110 and the second adjusting frequency generating unit 120 generate the first adjusting signal S1 and the second adjusting signal S2 to the first frequency adjusting unit 102 and the second frequency adjusting unit 104 for adjusting frequencies of the input signal Sin and the first output signal Out1, respectively.

The first adjusting frequency generating unit 110 and the second adjusting frequency generating unit 120 are targeted at adjusting different frequency ranges. In one embodiment, the first adjusting frequency generating unit 110 is for coarse tuning the frequency of the input signal Sin, and the second adjusting frequency generating unit 120 is for fine tuning the frequency of the input signal Sin. Therefore, the first range is larger than the second range, and a minimum adjustment value of the first adjusting frequency generating unit 110 is also larger than a minimum adjustment value of the second adjusting frequency generating unit 120. The first frequency adjusting unit 102 and the second frequency adjusting unit 104 both can be implemented by a mixer.

It is to be noted that, in order to maintain system stability as well as preventing induced noises, the first adjusting frequency generating unit 110 will stop changing the first adjusting signal S1 according to the first output signal Out1 when the frequency of the first output signal Out1 is within the first range. Under such circumstances, the value of the first adjusting signal S1 is constant, and a resultant frequency offset compensation value is constant as well. The second adjusting frequency generating unit 120 continues adjusting the second adjusting signal S2 for adjusting the frequency of the first output signal Out1, so as to further compensate frequency offset of the input signal Sin. Meanwhile, a determining unit 132 of the controller 130 compares the second adjusting signal S2 with a first predetermined adjusting range. When the second adjusting signal S2 exceeds the first predetermined adjusting range, a control unit 134 of the controller 130 controls the first adjusting frequency generating unit 110 and the second adjusting frequency generating unit 120 to adjust the first adjusting signal S1 and the second adjusting signal S2 to let the second adjusting signal S2 again fall within the first predetermined adjusting range. In one embodiment, the control unit 134 controls the first adjusting frequency generating unit 110 and the second adjusting frequency generating unit 120 until the second adjusting signal S2 falls within a second predetermined adjusting range which is within the first predetermined adjusting range.

Figure 2:
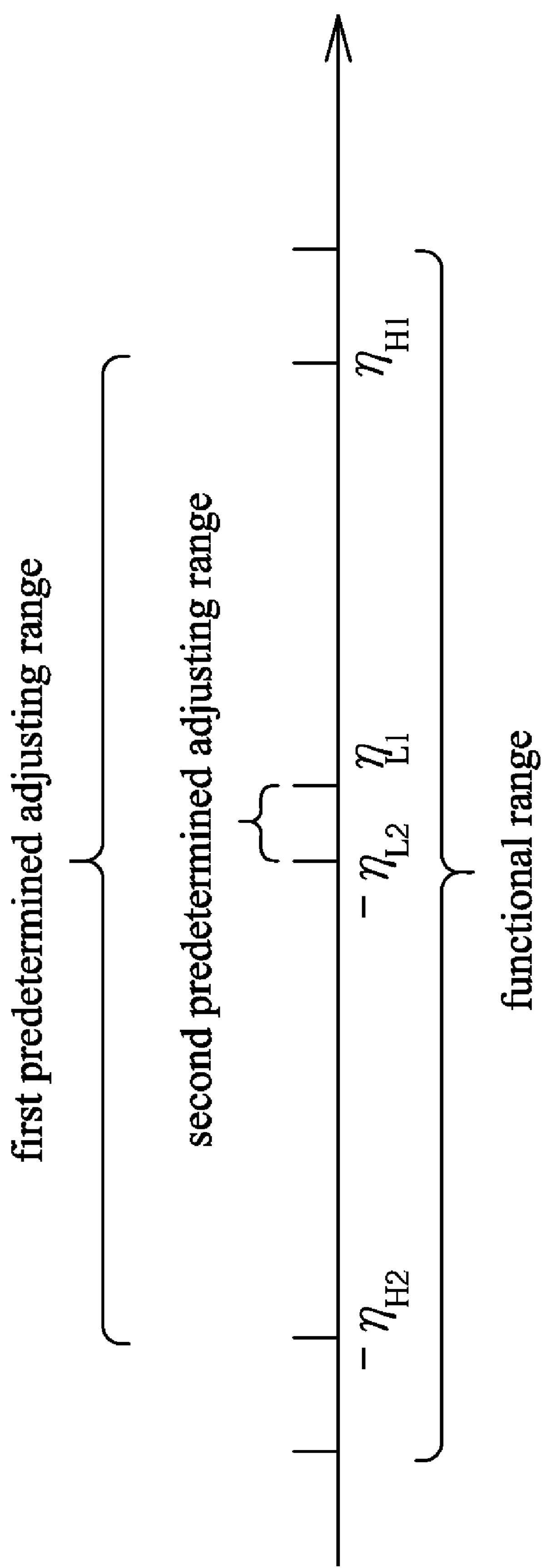
FIG. 2 is a schematic diagram showing correlations between a functional range of a second frequency adjusting unit, a first predetermined adjusting range and a second predetermined adjusting range.

FIG. 2 shows a schematic diagram illustrating correlations between a functional range of the second adjusting frequency generating unit 120, the first predetermined adjusting range and the second predetermined adjusting range. As shown in FIG. 2, the first predetermined adjusting range ($-\eta_{H2}\sim\eta_{H1}$) is slightly smaller than the functional range of the second adjusting frequency generating unit 120. In one embodiment, the functional range of the second adjusting frequency generating unit 120 is ±200 kHz, and the first predetermined adjusting range is ±150 kHz. Therefore, when the determining unit 132 detects that the frequency of the second adjusting signal S2 is larger than 150 kHz or smaller than −150 kHz, the control unit 134 controls the first adjusting frequency generating unit 110 and the second adjusting frequency generating unit 120 to adjust the first adjusting signal S1 and the second adjusting signal S2, until that the frequency of the second adjusting signal S2 is adjusted back into the second predetermined adjusting range ($-\eta_{L2}\sim\eta_{L1}$). The second adjusting frequency generating unit 120 subsequently adjusts the frequency of the first output signal Out1. Whereby, the controller 130 ensures the second adjusting frequency generating unit 120 operates within a functional range thereof during the adjustment process without incurring any system instability. Further, the invention does not limit that $\eta_{H2}$ be necessarily equal to $\eta_{H1}$, or $\eta_{L2}$ be necessarily equal to $\eta_{L1}$.

In one embodiment, the control unit 134 controls the first adjusting frequency generating unit 110 to gradually increase or decrease the frequency of the first adjusting signal S1 by a first predetermined value $\delta_1$, and controls the second adjusting frequency generating unit 120 to correspondingly decrease or increase the frequency of the second adjusting signal S2 by a second predetermined value $\delta_2$. Wherein, whether to increase or decrease depends on positive and negative signs of the frequency of the second adjusting signal S2. When the frequency of the second adjusting signal S2 is larger than $\eta_{H1}$, the control unit 134 controls the first adjusting frequency generating unit 110 to gradually increase the frequency of the first adjusting signal S1, and controls the second adjusting frequency generating unit 120 to correspondingly decrease the frequency of the second adjusting signal S2, until the frequency of the second adjusting signal S2 falls within the second predetermined adjusting range. Vice versa, when the frequency of the second adjusting signal S2 is smaller than $-\eta_{H2}$, the control unit 134 controls the first adjusting frequency generating unit 110 to gradually decrease the frequency of the first adjusting signal S1, and controls the second adjusting frequency generating unit 120 to correspondingly increase the frequency of the second adjusting signal S2. The first predetermined value $\delta_1$ need not necessarily be equal to the second predetermined value $\delta_2$, and the first predetermined value $\delta_1$ and the second predetermined value $\delta_2$ used by each adjustment may be variant. However, the second predetermined value $\delta_2$ ought to be smaller than the second predetermined adjusting range, so as to ensure that the frequency of the second adjusting signal S2 can be adjusted into the second predetermined adjusting range. Further, the first predetermined value $\delta_1$ and second predetermined value $\delta_2$ in inappropriately large numbers may result in system instability, and are thus selected according to system hardware performance. In one preferred embodiment, during the adjusting process on the first adjusting signal S1 and the second adjusting signal S2, the control unit 134 first adjusts the first adjusting signal S1 by the first predetermined value $\delta_1$, and correspondingly adjusts the frequency of the second adjusting signal S2 by the second predetermined value $\delta_2$ after having waited for a predetermined period. The above steps are repeated until the frequency of the second adjusting signal S2 falls within the second predetermined adjusting range.

The controller 130 may be realized using software, e.g., a control code executed by a processor. However, the invention does not limit the controller 130 to software. Without departing from scope of the invention, the controller 130 may also be hardware that controls the first adjusting frequency generating unit 110 and the second adjusting frequency generating unit 120.

Figure 3:
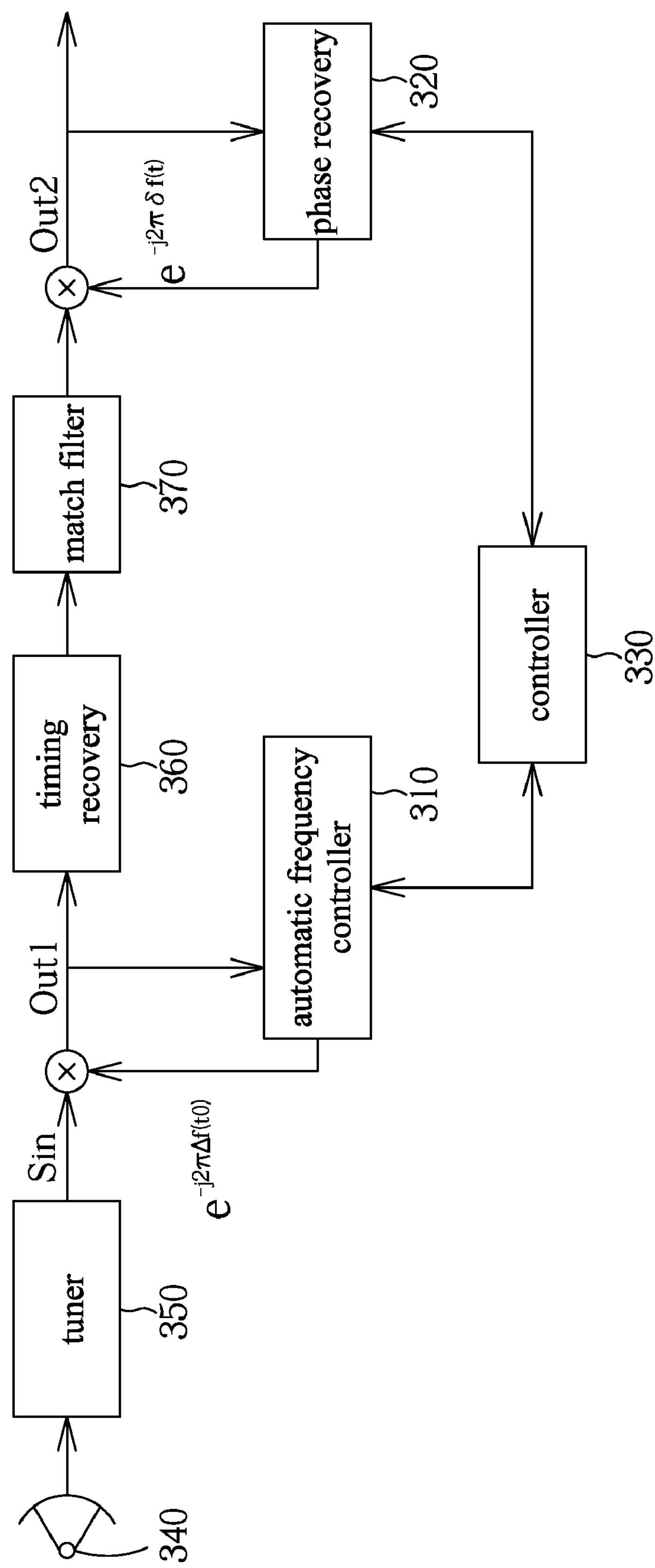
FIG. 3 is a functional diagram of illustrating the frequency adjusting apparatus in FIG. 1 implemented in a DVB-S system according to one embodiment of the invention.

FIG. 3 shows a functional diagram illustrating the frequency adjusting apparatus 100 in the foregoing embodiment implemented in a DVB-S system to compensate frequency offset of an input signal according to one embodiment of the invention. Note that the invention is not limited to DVB-S systems. That is, the frequency adjusting apparatus 100 may be implemented in any DVB systems and cell phone communication systems in order to provide frequency adjusting functions. In this embodiment, the first adjusting frequency generating unit is an automatic frequency controller (AFC) 310, and the second adjusting frequency generating unit is a phase recovery 320 implemented by a phase-locked loop (PLL) circuitry. The input signal Sin is given a signal having a frequency offset value of $f_0(t)$ after passing through a low noise block (LNB) 340 and having been down-converted by a tuner 350. Further, the first output signal Out1 is first processed by a timing recovery 360 and a match filter 370, followed by frequency offset thereof compensated by the phase recovery 320.

Figure 4:
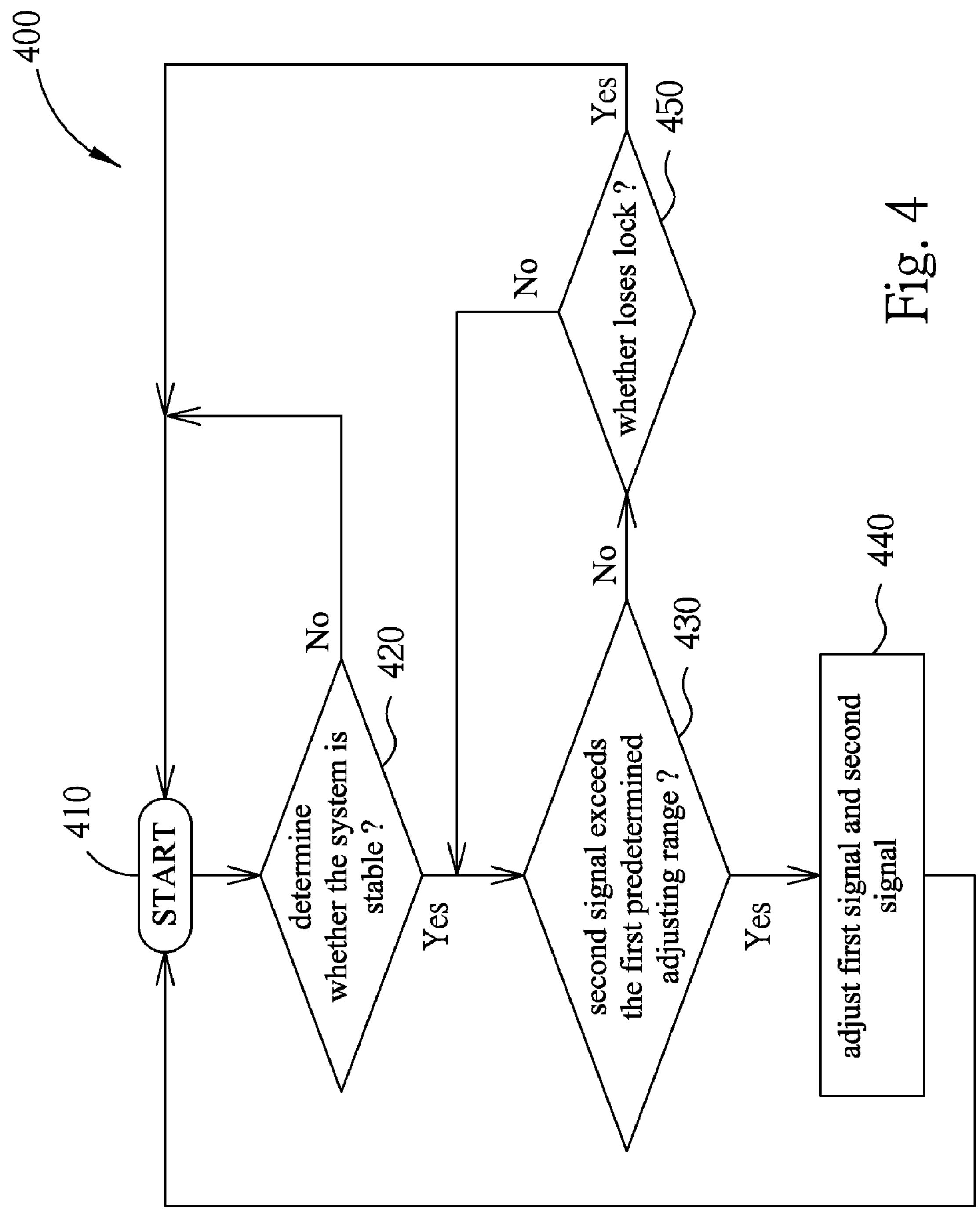
FIG. 4 is a flowchart of a frequency adjusting method according to one embodiment of the invention.

FIG. 4 shows a flowchart of a frequency adjusting method according to one embodiment of the invention. Upon start of a DVB-S system, after a starting Step 410, a procedure 400 enters Step 420 to determine whether the system is stable. Step 420 comprises determining whether the AFC 310, the timing recovery 360 and the match filter 370 reach a stable state, in which the frequency of first output signal Out1 is adjusted into the first range and the frequency of the first adjusting signal S1 is fixed to $\Delta f(t_0)$. When the system is stable, the phase recovery 320 generates the second adjusting signal S2 by aiming at conditions of $\Delta f(t_0)+\delta f(t)=f_0(t)$ to compensate frequency offset of the input signal Sin. In Step 430, determining whether the second adjusting signal S2 exceeds the first predetermined adjusting range is performed. In this embodiment, Step 430 determines whether $\delta f(t)$ is larger than $\eta_{H1}$ or smaller than $-\eta_{H2}$. When the $\delta f(t)$ is determined as larger than $\eta_{H1}$ or smaller than $-\eta_{H2}$, in Step 440, the AFC 310 is controlled to adjust the frequency $\Delta f(t_0)$ of the first adjusting signal S1 and the phase recovery 320 is controlled to adjust the frequency $\delta f(t)$ of the second adjusting signal S2, until $\delta f(t)$ falls between the second predetermined adjusting range $-\eta_{L1}$ and $\eta_{L2}$. In one embodiment, the controller 330 controls the phase recovery 320 to gradually increase or decrease $\delta f(t)$ by a predetermined value, and controls the AFC 310 to correspondingly decrease or increase $\Delta f(t_0)$ by the predetermined value, until $\delta f(t)$ falls within the second predetermined range. In addition, when it is determined that the second adjusting signal S2 does not exceed the first predetermined adjusting range in Step 430, Step 450 is proceeded to determine whether the AFC 310 or the phase recovery 320 lose lock in order to stop operations of the controller 330 in the event of lose lock, thereby elevating stability of the system.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A frequency adjusting apparatus, comprising:

a first frequency adjusting unit, for adjusting a frequency of an input signal according to a first adjusting signal to generate a first output signal;

a first adjusting frequency generating unit, for generating the first adjusting signal according to a frequency of the first output signal to adjust the frequency of the first output signal into a first range;

a second frequency adjusting unit, for adjusting the frequency of the first output signal according to a second adjusting signal to generate a second output signal;

a second adjusting frequency generating unit, for generating the second adjusting signal according to a frequency of the second output signal to adjust the frequency of the second output signal into a second rage; and a controller, for controlling the first adjusting frequency generating unit and the second adjusting frequency generating unit according to the second adjusting signal thereby adjusting both the first adjusting signal and the second adjusting signal, comprising:

a determining unit, for comparing the second adjusting signal with a first predetermined adjusting range to generate a determination result; and a control unit, for controlling the first adjusting frequency generating unit and the second adjusting frequency generating unit according to the determination result to adjust the first adjusting signal and the second adjusting signal.

2. The frequency adjusting apparatus as claimed in claim 1, wherein the first adjusting frequency generating unit stops changing the first adjusting signal when the frequency of the first output signal is within the first range.

3. The frequency adjusting apparatus as claimed in claim 1, wherein, when the second adjusting signal is not within the first predetermined adjusting range, the control unit controls the first adjusting frequency generating unit and the second adjusting frequency generating unit to adjust the first adjusting signal and the second adjusting signal, so the second adjusting signal falls within the first predetermined adjusting range.

4. The frequency adjusting apparatus as claimed in claim 3, wherein the control unit controls the first adjusting frequency generating unit and the second adjusting frequency generating unit to adjust the first adjusting signal and the second adjusting signal until the second adjusting signal falls within a second predetermined adjusting range within the first predetermined adjusting range.

5. The frequency adjusting apparatus as claimed in claim 4, wherein the control unit controls the second adjusting frequency generating unit to increase or decrease a frequency of the second adjusting signal by a predetermined value, which is smaller than the second predetermined adjusting range, each time the control unit adjusts the second adjusting signal.

6. The frequency adjusting apparatus as claimed in claim 1, wherein the controller controls the first adjusting frequency generating unit to gradually increase or decrease a frequency of the first adjusting signal by a first predetermined value, and controls the second adjusting frequency generating unit to correspondingly decrease or increase a frequency of the second adjusting signal by a second predetermined value.

7. The frequency adjusting apparatus as claimed in claim 6, wherein the first predetermined value equals to the second predetermined value.

8. The frequency adjusting apparatus as claimed in claim 1, wherein the first adjusting frequency generating unit is an automatic frequency controller and the second adjusting frequency generating unit is a phase-locked loop (PLL) circuitry, wherein the controller for controlling the first adjusting frequency generating unit and the second adjusting frequency generating unit stops operating when the automatic frequency controller or the PLL circuitry loses lock.

9. The frequency adjusting apparatus as claimed in claim 1, being implemented in a Digital Video Broadcasting (DVB) system, for compensating frequency offset of the input signal.

10. A frequency adjusting method, comprising steps of:

generating a first adjusting signal according to a frequency of a first output signal;

adjusting a frequency of an input signal with the first adjusting signal to generate the first output signal, so as to adjust the frequency of the first output signal into a first range;

generating a second adjusting signal according to a frequency of a second output signal;

adjusting the frequency of the first output signal with the second adjusting signal to generate the second output signal, so as to adjust the frequency of the second output signal into a second range; and adjusting both the first adjusting signal and the second adjusting signal according to the second adjusting signal, comprising the steps of:

comparing the second adjusting signal with a first predetermined adjusting range to generate a determination result; and adjusting the first adjusting signal and the second adjusting signal according to the determination result.

11. The frequency adjusting method as claimed in claim 10, wherein the step of adjusting the frequency of an input signal by using the first adjusting signal to generate the first output signal so as to adjust the frequency of the first output signal into a first range further comprises a step of:

stopping changing the first adjusting signal when the frequency of the first output signal is adjusted into the first range.

12. The frequency adjusting method as claimed in claim 10, wherein the step of adjusting the first adjusting signal and the second adjusting signal according to the determination result further comprises a step of:

adjusting the first adjusting signal and the second adjusting signal when the second adjusting signal is not within the first predetermined adjusting range, so the second adjusting signal falls within the first predetermined adjusting range.

13. The frequency adjusting method as claimed in claim 12, wherein the step of adjusting the first adjusting signal and the second adjusting signal further comprises a step of:

adjusting the first adjusting signal and the second adjusting signal until the second adjusting signal falls within a second predetermined adjusting range within the first predetermined adjusting range.

14. The frequency adjusting method as claimed in claim 13, wherein the step of adjusting the first adjusting signal and the second adjusting signal further comprises a step of:

increasing or decreasing a frequency of the second adjusting signal by a predetermined value, which is smaller than the second predetermined adjusting range, each time the second adjusting signal is adjusted.

15. The frequency adjusting method as claimed in claim 10, wherein the step of adjusting the first adjusting signal and the second adjusting signal further comprises a step of:

gradually increasing or decreasing a frequency of the first adjusting signal by a first predetermined value, and correspondingly decreasing or increasing a frequency of the second adjusting signal by a second predetermined value.

16. The frequency adjusting method as claimed in claim 15, wherein the first predetermined value equals to the second predetermined value.

17. The frequency adjusting method as claimed in 10, being implemented in a Digital Video Broadcasting (DVB) system, for compensating frequency offset of the input signal.

* * * * *